United States Patent [19]
Coleman et al.

[11] Patent Number: 6,166,849
[45] Date of Patent: Dec. 26, 2000

[54] AROMATIC GLYCIDYL AMINE-BASED EPOXY EDGE SEALS FOR ELECTROOPTIC DEVICES

[75] Inventors: Charles R. Coleman, Pittsburgh; Barbara J. George, Irwin, both of Pa.

[73] Assignee: PPG Industries Ohio, Inc., Cleveland, Ohio

[21] Appl. No.: 09/211,786

[22] Filed: Dec. 15, 1998

[51] Int. Cl.⁷ .............................. G02F 1/153; G02F 1/15; B29C 73/00; B32B 17/00
[52] U.S. Cl. ........................... 359/270; 359/265; 156/99; 156/107
[58] Field of Search .................................. 359/265, 270, 359/321; 349/153; 264/1.1, 1.32, 1.38; 156/99, 107

[56] References Cited

U.S. PATENT DOCUMENTS

| | | | |
|---|---|---|---|
| 5,116,684 | 5/1992 | Fretz, Jr. et al. | 428/417 |
| 5,327,281 | 7/1994 | Cogan et al. | 359/270 |
| 5,576,398 | 11/1996 | Takahashi | 525/528 |
| 5,657,150 | 8/1997 | Kallman et al. | 359/275 |

FOREIGN PATENT DOCUMENTS

| | | |
|---|---|---|
| 57-058125 | 4/1982 | Japan . |
| 61-281121 | 4/1982 | Japan . |
| 57-136629 | 8/1982 | Japan . |
| 61-108624 | 5/1986 | Japan . |
| WO 98/24839 | 6/1998 | WIPO . |

OTHER PUBLICATIONS

U.S. Patent Application Serial No. 08/970,031 entitled "Suspension Lamination Method and Device", filed Nov. 13, 1997, by Charles R. Coleman, et al.

U.S. Patent Application Serial No. 08/995,788 entitled "Method for Sealing a Laminated Electrochromic Device Edge", filed Dec. 22, 1997, by Charles R. Coleman, et al.

U.S. Patent Application Serial No. 08/996,064 entitled "Edge Design for Electrochromic Devices", filed Dec. 22, 1997, by John E. Smarto, et al.

U.S. Patent Application Serial No. 09/046,385 entitled "Tab and Bus Bar Application Method", filed Mar. 23, 1998, by J. E. Smarto.

U.S. Patent Application Serial No. 09/046,386 entitled "Method for Forming a Molded Edge Seal", filed Mar. 23, 1998, by John E. Smarto, et al.

*Primary Examiner*—Georgia Epps
*Assistant Examiner*—David N. Spector
*Attorney, Agent, or Firm*—William C. Mitchell

[57] ABSTRACT

A method for sealing the peripheral edge surface of a laminated electrooptic device, wherein an aromatic glycidyl amine-based epoxy is used as a seal. Sealed devices are also disclosed.

14 Claims, No Drawings

AROMATIC GLYCIDYL AMINE-BASED EPOXY EDGE SEALS FOR ELECTROOPTIC DEVICES

FIELD OF THE INVENTION

This invention relates to a method for sealing the peripheral edge surface of a laminated electrooptic device, such as a laminated electrochromic lens, and to the resulting sealed device.

BACKGROUND OF THE ART

The optical properties of electrochromic materials change in response to electrically driven changes in oxidation state. Thus, when an applied voltage from an external power supply causes electrons to flow to (reduction) or from (oxidation) an electrochromic material, its transmittance properties change. In order to maintain charge neutrality, a charge balancing flow of ions in the electrochromic device is needed. By enabling the required electron and ion flows to occur, an electrochromic device utilizes reversible oxidation and reduction reactions to achieve optical switching.

Conventional electrochromic devices comprise at least one thin film of a persistent electrochromic material, i.e. a material which, in response to the application of an electric field of given polarity, changes from a high-transmittance, non-absorbing state to a low-transmittance, absorbing or reflecting state. Since the degree of optical modulation is directly proportional to the current flow induced by the applied voltage, electrochromic devices demonstrate light transmission tunability between high-transmittance and low-transmittance states. In addition, these devices exhibit long-term retention of a chosen optical state, requiring no power consumption to maintain that optical state. Optical switching occurs when an electric field of reversed polarity is applied.

To facilitate the aforementioned ion and electron flows, an electrochromic film which is both an ionic and electronic conductor is in ion-conductive contact, preferably direct physical contact, with an ion-conducting material layer. The ion-conducting material may be inorganic or organic, solid, liquid or gel, and is preferably an organic polymer which also serves as a laminating agent. The electrochromic film(s) and ion-conductive material are disposed between two electrodes, forming a laminated cell.

When the electrode adjacent to the electrochromic film is the cathode, application of an electric field causes darkening of a cathodically-coloring film. Reversing the polarity causes electrochromic switching, and the film reverts to its high-transmittance state. Typically, an electrochromic film such as tungsten oxide is deposited on a substrate coated with an electroconductive film such as tin oxide or indium tin oxide to form one electrode. The counter electrode is typically a similar tin oxide or indium tin oxide coated substrate.

A typical laminated electrochromic device, such as an electrochromic lens, comprises a first electroconductive material layer (which serves as a first electrode) an electrochromic layer, an ion-conducting material layer and a second electroconductive layer (which serves as a second electrode). Preferably, a complementary electrochromic layer is also used. These electroconductive and electrochromic layers, along with the ion-conducting material layer, can be arranged as a single stack deposited on a first substrate which is then laminated to a second substrate, or they can be arranged such that the electrodes are coated on separate substrates, followed by placement of one or more electrochromic layers on the substrates. The coated substrates are then laminated via a technique which positions an ion-conducting material between them. Preferably, an ion-conducting polymer, which also serves as a bonding agent, is used to bond the complementary substrates.

As voltage is applied across the electrodes, ions are conducted through the ion-conducting material. To ensure reliable operation, the peripheral edge surface of the ion-conducting material layer generally must be sealed so as to maintain its water content within a range sufficient to provide the required ion conductivity. Absent an adequate seal, moisture loss or gain through the exposed edge of the ion-conducting material layer impacts performance.

The peripheral edge surface of a laminated electrooptic device may be shaped to support or interlock with an edge seal. For example, copending and commonly owned U.S. patent application Ser. No. 08/995,788, filed Dec. 22, 1997, now U.S. Pat. No. 5,969,847, discloses a nubbed-edge design that facilitates application of an edge seal to the peripheral edge surface of an electrochromic device. Also, copending and commonly owned U.S. patent application Ser. No. 08/996,064 (now U.S. Pat. No. 5,953,150) and Ser. No. 09/046,386, filed on Dec. 22, 1997 and Mar. 23, 1998, respectively, disclose methods for sealing laminated electrochromic devices.

U.S. Pat. No. 5,327,281 to Cogan discloses the use of epoxy to seal a cavity formed when a spacer is used to separate electrodes and contain a liquid electrolyte injected between the spaced electrodes.

U.S. Pat. No. 5,657,150 to Kallman et al., discloses an electrochromic device having an isolative barrier which electrically isolates the device electrodes.

SUMMARY OF THE INVENTION

The instant invention is directed to the use of aromatic glycidyl amine-based epoxies as sealants for electrooptic devices. More particularly, an epoxy prepared from an aromatic glycidyl amine resin and an effective amount of a suitable curing agent is applied as a moisture seal to the peripheral edge surface of a laminated electrooptic device, such as a laminated electrochromic lens, having a peripheral edge surface prone to moisture gain or loss. Such seals are especially useful when moisture loss or gain through the peripheral edge surface of an electrooptic device is critical to device performance.

This invention also relates to electrooptic devices having aromatic glycidyl amine-based edge seals. In the case of a laminated electrochromic device containing an ion-conducting polymer (ICP) interlayer, the seal preferably covers and contacts the exposed outer edge of the ICP layer, which enables the water content of the ICP layer to be maintained within a suitable range. This in turn helps to maintain the required ion-mobility and the device's operability.

DETAILED DESCRIPTION OF THE PREFERRED EMBODIMENTS

Other than in the Examples, or where otherwise indicated, all numbers quantifying ingredients, dimensions, ratios, ranges, reaction conditions, etc., used herein are to be understood as modified in all instances by the term "about".

In one sense, the instant invention is directed to a method for sealing the peripheral edge surface of a laminated electrooptic device comprising first and second complementary substrates. Typically, at least one of the substrates contains one or more electroconductive and/or electrochromic coatings, and an ion-conducting material layer is disposed between the complementary substrates. This method comprises: a) applying an effective amount of an epoxy sealant comprising an aromatic glycidyl amine resin to the peripheral edge surface of a device to be sealed; and b) allowing the epoxy sealant to cure.

The instant invention is further directed to a method for sealing all or a portion of the peripheral edge surface of a laminated electrochromic device, such as a laminated electrochromic lens, said peripheral edge surface comprising the outer peripheral surfaces of first and second complementary lens substrates and the outer peripheral surface of a bonding layer that bonds the complementary lens substrates, preferably an ion-conducting polymer (ICP) layer, wherein the outer peripheral surface of the bonding layer is situated between the outer peripheral surfaces of the first and second lens substrates. This method comprises applying an effective amount, i.e., a sufficient amount for the purpose of sealing a given electrochromic device, of an aromatic glycidyl amine-based epoxy to the peripheral edge surface being sealed, and allowing the epoxy to cure. As used herein, the term "aromatic glycidyl amine-based epoxy" means an epoxy which is formed by combining and curing an aromatic glycidyl amine resin with an effective amount of one or more suitable curing agents. Thus, to seal a given device, an aromatic glycidyl amine resin is combined with an effective amount of a suitable curing agent via a conventional mixing technique, and the resulting admixture is applied to the peripheral edge surface being sealed via a suitable application means. In the case of an electrochromic lens containing an ion-conducting polymer, the admixture is preferably applied over and contacts the ICP layer on the peripheral edge surface of the lens, thereby impeding moisture ingress/egress to/from the ICP layer.

Another embodiment of the instant invention is directed to an edge-sealed laminated electrooptic device 8 comprising an ion-conducting material layer 7 disposed between a first substrate 1, which has front expanse surface 3 and electroconductive expanse surface 4, and a second substrate, 2, which has an electroconductive expanse surface 5 and rear expanse surface 6, said device having a peripheral edge surface prone to moisture gain or loss, wherein said peripheral edge surface 10 contains an aromatic glycidyl amino-based epoxy edge seal 9, substantially as shown in FIG. 1. Preferably this seal is in contact with the outer peripheral surface of the ion-conducting material layer.

The instant invention is also directed to a laminated electrochromic lens comprising a first coated lens, a second lens, which may or may not be coated, and an ion-conducting polymer (ICP) layer disposed between said first and second lenses, said laminated electrochromic lens having a peripheral edge surface prone to moisture gain or loss through the outer surface of said ion-conducting polymer layer, wherein said peripheral edge surface contains an aromatic glycidyl amine-based epoxy sealant.

Preferred aromatic glycidyl amine resins of the instant invention can be represented by formula (I):

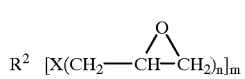

(I)

where:
R² is phenylene or naphthylene; X, which can be the same or different within a given resin, is N, NR³, CH₂N, CH₂NR³, O or C(O)—O; R³ is an alkyl group containing 1–4 carbon atoms, a cyanoethyl group or a cyanopropyl group; n is 1 or 2; and
m is 2 to 4.

A particularly preferred aromatic glycidyl amine epoxy resin is N,N,N',N'-tetraglycidyl-m-xylenediamine, which can be represented by formula (II):

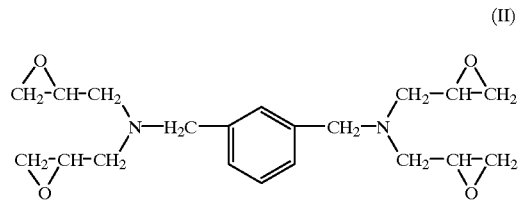

(II)

This resin, which is commercially available as TETRAD® X from Mitsubishi Gas Chemical Company, Inc., can be combined with various curing agents to form edge seal epoxies which adhere well to electrooptic substrates; have excellent moisture barrier qualities; and flow readily onto peripheral edge surfaces, particularly when applied via a molding technique. The inventors have found TETRAD X to have a Brookfield viscosity of less than 3000 cps at 25° C. using a No. 31 spindle at 6 r.p.m.

Reaction of the instant epoxy resins with an effective amount of a suitable curing agent leads to formation of a crosslinked or thermoset epoxy sealant. Any suitable curing agent can be used, including, for example, amine-based curing agents such as polyamines; polyamides; polyphenols; polymeric thiols; polycarboxylic acids; and anhydrides. As used herein, the term "curing agent" refers to a compound which effects conversion of an aromatic glycidyl amine resin to an epoxide polymer which can be used to seal the peripheral edge surface of an electrooptic device.

Polyamine curing agents and polyamide curing agents formed by reacting polyamines with dimerized fatty acids are generally suitable. Polyamine curing agents include aliphatic, aromatic, cycloaliphatic and heterocyclic polyamines. Modified aliphatic polyamines can also be used; these curing agents are typically prepared by reacting an aliphatic polyamine with one or more chemical entities to provide a polyamine having one or more substituted aliphatic functional groups.

Examples of suitable aliphatic amine curing agents include, but are not limited to, diethylene triamine and tetraethylene triamine, which are low viscosity liquids that are known to react with glycidyl-based epoxy resins at ambient temperatures. Aliphatic diamines based on propylene oxide and ammonia can also be used. Examples of aromatic polyamines include bis(4-aminophenyl)methane and bis(4-aminophenyl)sulfone, and examples of cycloaliphatic polyamines include cyclohexane-1,2-diamine and methanediamine. A particularly preferred curing agent is a modified aliphatic polyamine such as ANCAMINE® 1856, which is a Mannich-base (CAS No. 57214-10-5) derived from the reaction of benzene 1,3 dimethaneamine with phenol and formaldehyde, commercially available from Air Products and Chemicals, Inc.

An effective amount of a suitable curing agent is used. Relative to curing agents, the term "effective amount" refers to that quantity of curing agent necessary to form a cured epoxy seal when combined with an aromatic glycidyl amine resin. It is also noteworthy that a plurality of curing agents can be combined to cure a given resin. Curing agents typically cure epoxy resins by the reaction of active hydrogen sites with terminal epoxy groups. Thus, suitable resin:curing agent weight ratios can be determined stoichiometrically by skilled practitioners by counting the available hydrogen reaction sites and the number of epoxide rings for a given curing agent/resin system. For example, if an amine-based curing agent is used, the approximate amount of amine-based curing agent needed to react completely with a given epoxy resin having a predetermined epoxy equivalent mass can be calculated by dividing the molecular mass of the amine by the number of reactive sites on the curing agent. Adjustments may be necessary due to steric and diffusional effects. Alternatively, proper ratios can be determined empirically, particularly when curing agents are complex mixtures containing several reactive functional groups. Suitable active hydrogen equivalent (in a curing agent) to epoxy equivalent (in a resin) ratios generally range from 0.75 to 1.5:1, preferably from 0.9 to 1.15:1.

A curing agent and an aromatic glycidyl amine resin, alone or in combination with other constituents, can be combined via any conventional technique. Typically, the resin and curing agent are held in separate containers which exit into a common conduit or chamber, wherein mixing occurs. Alternatively, the resin and curing agent can be applied separately to a substrate or container, and mixed in situ. Effective amounts, i.e., an amount suitable to provide a desired effect, of other constituents may also be incorporated into the instant resin/curing agent admixtures, including, for example, fillers, solvents, diluents, plasticizers, accelerators, curatives, and tougheners. Addition of such agents is well within the purview of skilled practitioners. Preferred curing agent/aromatic glycidyl amine resin compositions flow readily onto peripheral edge surfaces, particularly a surface situated within the cavity of an edge seal mold, and form moisture barriers that adhere well to electrooptic substrates.

A curing agent/resin admixture which produces an aromatic glycidyl amine-based epoxy upon curing can be applied to a laminated electrooptic device via any suitable application technique, including, inter alia, dipping, brushing, swabbing or extrusion techniques or by the apex edge molding technique of co-pending and commonly assigned U.S. patent application Ser. No. 09/046,385, filed Mar. 23, 1998, which is incorporated herein by reference. Irrespective of the application method utilized, an effective amount of a curing agent/resin admixture is applied, i.e., an amount sufficient to provide a seal of desired thickness over the desired portion of a given peripheral edge surface.

The laminated electrochromic devices of this invention contain an ion-conducting material layer disposed between mated first and second substrates. Various ion-conducting materials can be used, including for example, materials comprising hydrogen uranyl phosphate or polyethylene oxide/LiClO$_4$. Also, ion-conducting polymer electrolytes or inorganic films such as LiNbO$_3$, LiBo$_3$, LiTaO$_3$, LiF, Ta$_2$O$_5$, Na$_2$AlF$_6$, Sb$_2$O$_5$ nH$_2$O+Sb$_2$O$_3$, Na$_2$O 11Al$_2$O$_3$, MgF$_2$, ZrO$_2$, Nb$_2$O$_5$ and Al$_2$O$_3$ can be used as the ion-conducting material. Preferred ion-conducting materials are ion-conducting polymers; these polymers generally serve the dual functions of being ion-conducting electrolytes and mechanical adhesives. One class of suitable ion-conducting materials includes ion-containing polymers known as ionomers. These macromolecules contain ionizable groups covalently linked to a polymer chain, typically a hydrocarbon. Polystyrene sulfonic acid and poly (2-acrylamido-2-methyl-1-propanesulfonic acid) are examples of ionomers, both incorporating the protonic acid SO$_3$H group on the polymer chain. Ionomers are generally formed by polymerizing monomers bearing both an ionizable group and an ethylenic, e.g. vinylic, group.

Preferred ionomers include proton-conducting polymers selected from the group consisting of homopolymers of 2-acrylamido-2-methylpropanesulfonic acid (AMPSA) and copolymers of AMPSA with various monomers. Such polymers may be utilized in the form of preformed sheets which are laminated between the substrates, or in the form of liquid reaction mixtures of monomers which are cast and cured in place between the substrates. A preferred proton-conducting polymer electrolyte is a copolymer of AMPSA and N,N-dimethylacrylamide (DMA), preferably cast and cured in place. More preferred copolymers of AMPSA and DMA are prepared from AMPSA and DMA monomers in a molar ratio range of about 1:3 to 1:2. The thickness of the polymer electrolyte is not believed to be critical but in general is in the range of 0.001 to 0.025 inch (0.0254 to 0.625 millimeter).

The first and second substrates of the instant laminated electrochromic devices are generally glass or organic polymeric substrates conventionally used to prepare electrochromic articles or devices. Preferably, polymeric organic substrates are used. Substrates to which the aromatic glycidyl amine-based epoxies of the present invention can be applied are preferably prepared from transparent materials suitable for producing eyewear lenses, such as lenses prepared from synthetic organic optical resins. Suitable transparent lenses may have a conventional refractive index (1.48–1.5), a relatively high refractive index (1.60–1.75), or a mid-range refractive index (1.51–1.59), depending on the end use. Alternatively, a substrate can be a non-transparent solid material.

Synthetic polymer substrates that may be used as a lens material include, but are not limited to: thermoplastic polycarbonates, such as the carbonate-linked resin derived from bisphenol A and phosgene, which is sold under the trademark LEXANO®; polyesters, such as the material sold under the trademark, MYLAR®; poly(methylmethacrylates), such as the material sold under the trademark, PLEXIGLAS®; and polymerizates of a polyol (allyl carbonate) monomer, especially diethylene glycol bis(allyl carbonate), which is sold under the trademark CR-39®. Copolymers of the aforedescribed monomers/resins may also be used as a lens material. These and other transparent and non-transparent polymeric substrates known in the art for use for various optical and non-optical applications may be used.

Conventionally, in the preparation of electrochromic lenses, a cathodically coloring electrochromic material, usually tungsten oxide or compounds thereof, is deposited at a thickness of about 800 to 5,000 Angstroms on a transparent substrate that has been previously coated with an electroconductive metal oxide film, such as tin oxide or indium tin oxide (ITO), which electroconductive film serves as one electrode. Preferably, the electroconductive film comprises indium and tin at a weight ratio of about 90:10. The film thickness is preferably in the range of 800 to 4,000 Angstroms for acceptable conductivity. The electroconductive and electrochromic films may be deposited by a variety of methods so long as the substrate is not deleteriously affected. In such lenses, the counter electrode can be prepared by depositing a similar metal oxide coating on a second transparent substrate, with or without a complementary electrochromic film. A suitable complementary electrochromic film is a nitrogen-containing iridium oxide film.

Lamination of electrochromic lenses can be accomplished by placing a curable ion-conducting polymer composition, i.e. a monomer solution containing one or more monomers, an effective amount of an initiator and optionally one or more non-reactive diluents and/or additives, on the concave interface surface of a matched lens pair and moving the concave interface surface and the convex interface surface of the corresponding lens toward each other, thereby spreading the curable adhesive composition between the lenses. The curable ICP composition is then cured via exposure to a suitable energy source. Curing of the polymer places an ion-conducting polymer between the lenses while bonding the lenses into a laminate, thereby facilitating necessary ion flow. The suspension lamination technique disclosed in co-pending and commonly assigned U.S. patent application Ser. No. 08/970,031, filed Nov. 13, 1997, is preferred.

After lamination, the laminated electrochromic device, preferably an electrochromic eyewear lens, comprises an ion-conducting material, preferably an ion-conducting polymer, sandwiched between suitably coated substrates. Absent an edge seal, the ion-conducting material is exposed to the environment along the edge of the laminate. To reduce moisture transfer into or out of this layer, it is desirable to seal the edge of the lens via the instant invention using an aromatic glycidyl amine-based epoxy. These epoxies provide improved moisture barrier properties.

The cross-sectional profiles of the instant edge seals generally conform to the shapes of device edges being sealed. The profile of a device edge is not believed to be critical; flat, grooved, nubbed and irregular shaped edges can be used. Nubbed edges are preferred because they are easily formed using a beveled edger on each of the substrates forming a matched laminated pair and because they can be designed to interlock with the instant glycidyl amine-based epoxy seals. In the case of electrochromic lenses, the profile of the seal should not interfere with attachment of the lenses to a suitable frame.

EXAMPLES

The following examples are presented for illustrative purposes only and are not intended to limit the invention in any way.

manufacturers' instructions, swabbing the resulting admixtures onto the flats and allowing the admixtures to cure. This procedure was repeated twice for each flat to insure complete coverage.

The initial water content of each flat was then determined via a near infrared (NIR) technique using a Braker IFS 66/S analyzer. Water content values were determined based on both 5250 $cm^{-1}$ band areas and 5250/5800 band ratios. The epoxy sealed flats were next placed into a QUV accelerated weather tester for three(3) days at 50° C. and 98% relative humidity. Final water contents were then determined using the above desired NIR technique. Data showing the impact of various seals on water ingress to the flats appears in Table I. In the examples:

TETRAD® X is N,N,N',N'-tetraglyglycidyl-m-xylenediamine, commercially available from MITSUBISHI Gas Chemical Company.

EPON® 880 is a Bisphenol A-based (DGEBA) epoxy resin, commercially available from Shell Chemical Company.

ANCAMIDE® 2353 is a modified polyamide curing agent (typical viscosity: 3000 cps @ 77° F.), commercially available from Air Products and Chemicals, Inc.

ANCAMINE® 2205 is an accelerated aliphatic amine curing agent (typical viscosity: 3600 cps @ 77° F.), commercially available from Air Products and Chemicals, Inc.

ANCAMINE 1895 is a cycloaliphatic amine adduct curing agent (typical viscosity: 1200 cps @ 71° F.), commercially available from Air Products and Chemicals, Inc.

ANCAMINE 1856 is a modified aliphatic amine curing agent (typical viscosity 3000 cps @ 77° F.), commercially available from Air Products and Chemicals, Inc.

ANCAMINE 2432 is a modified aliphatic amine curing agent (typical viscosity: 300 cps @ 77° F.), commercially available from Air Products and Chemicals, Inc.

TABLE I

Resin: Curing Agent Weight Ratio (Active Basis) = 5:3.3*

| | | | Using 5250 $cm^{-1}$ | | | | Using 5250/5800 Band Ratio | | | |
|---|---|---|---|---|---|---|---|---|---|---|
| Example No. | Resin* | Curing Agent* | Dry IR | Wet IR | Δ IR | % Moisture Decrease | Dry IR | Wet IR | Δ IR | % Moisture Decrease |
| (1 Control) | — | — | 15.03 | 60.96 | 45.93 | — | .0828 | .3480 | .2652 | — |
| 2 | TETRAD X | ANCAMIDE 2353 | 15.97 | 74.80 | 58.83 | −28.09 | .0718 | .3430 | .2712 | −2.26 |
| 3 | TETRAD X | ANCAMIDE 2205 | 14.84 | 76.13 | 61.29 | −33.44 | .0661 | .03539 | .2878 | −8.52 |
| 4 | TETRAD X | ANCAMIDE 1895 | 14.11 | 56.65 | 42.54 | 7.38 | .0730 | .2970 | .2240 | 15.54 |
| 5 | TETRAD X | ANCAMIDE 1856 | 12.36 | 26.46 | 14.1 | 69.30 | .0621 | .1329 | .0708 | 73.30 |
| 6 | TETRAD X | ANCAMIDE 2432 | 13.34 | 53.49 | 40.15 | 12.58 | .0709 | .2913 | .2204 | 16.89 |
| (7 Control) | — | — | 13.74 | 65.19 | 51.45 | — | .0618 | .3048 | .2430 | — |
| 8 | EPON880 | ANCAMINE 2205 | 13.54 | 52.57 | 39.03 | 24.14 | .0595 | .2384 | .1789 | 26.48 |
| 9 | EPON880 | ANCAMINE 1895 | 12.77 | 55.66 | 42.89 | 16.64 | .0598 | .2701 | .2103 | 13.46 |
| 10 | EPON880 | ANCAMINE 1856 | 13.02 | 40.09 | 27.07 | 47.39 | .0592 | .1867 | .1275 | 47.53 |
| 11 | EPON880 | ANCAMINE 2432 | 13.08 | 59.93 | 46.85 | 8.94 | .0594 | .2833 | .2239 | 7.86 |

Examples 1–11

Water Transport Into Epoxy-Coated CR-39 Sheets

Flat sheets prepared from CR-39® monomer, each approximately 5 cm wide×5 cm long×0.6 cm thick, were dried at 50° C. for one (1) week and then coated on all sides using the epoxy admixtures specified in Table I by mixing the resins and curing agents shown in accordance with

Example 12

Sealing a Nubbed Electrochromic Lens

A laminated electrochromic lens having a continuous peripheral edge nub aligned with its ion-conducting polymer layer was constructed by a cast-in-place lamination technique as described below. The priming, cleaning, coating, edging, ion-conducting polymer and laminating aspects of this example are not part of the instant invention.

Each of a matched pair of plastic lenses, polymerized from CR-39® monomer and primed with an organo silane hardcoat, was edged using a Gerber Elite EFS lens edger to form a half-nub on its edge adjacent to its mating surface. An edging wheel was used to shape each lens so as to form half of a mesa-shaped nub along the peripheral edge of each part adjacent to its mating surface. The half nub on each lens was about 0.25 mm in width by about 1.0 mm height.

The edged lenses were cleaned and dried using an ultrasonic cleaning system. After these steps, thin films of $In_2O_3:SnO_2$ (ITO) were deposited onto the mating surfaces of the nubbed plastic substrates using direct current (dc) magnetron sputtering. Electrochromic layers were then separately deposited onto the respective ITO coated plastic substrates. A thin tungsten oxide film was deposited on one substrate by direct current magnetron sputtering, and a nitrogen-containing iridium oxide thin film was deposited on the other substrate by direct current magnetron sputtering.

An ion-conducting polymer monomer solution comprising 2-acrylamido-2-methylpropanesulfonic acid (AMPSA) and N,N-dimethylacrylamide (DMA) in 1-methyl-2-pyrrolidinone (NMP) and water and containing an effective amount of a photoinitiator was prepared. This precursor was placed between the $WO_3$ and nitrogen-containing iridium oxide half cells and then exposed to suitable energy to cure the ion-conducting polymer.

The resulting laminated electrochromic lens contained a 1 mm high nub at the interface of its front and rear lenses which was aligned with the outer peripheral surface of its AMPSA/DMA polymer inter layer. TETRAD X and ANCAMINE 1856, at a resin:curing agent weight ratio of 1.52:1, were fed through the inline mixer of an epoxy dispenser and the resulting composition was cast onto the peripheral edge surface of the lens over its nub according to apex edge molding method of copending and commonly assigned U.S. patent application Ser. No. 09/046,386, which is incorporated herein by reference. The TETRAD X/ANCAMINE 1856 composition was then allowed to cure, resulting in a lens having an aromatic glycidyl amine-based epoxy seal interlocked with its peripheral nub.

It is evident from the foregoing that various modifications, which are apparent to those skilled in the art, can be made to the embodiments of this invention without departing from the spirit or scope thereof. Having thus described the invention, it is claimed as follows.

We claim:

1. A method for sealing the peripheral edge surface of a laminated electrochromic device, said peripheral edge surface comprising the outer peripheral surfaces of first and second substrates and the outer peripheral surface of an ion-conducting material layer, said method comprising:

(a) mixing an aromatic glycidyl amine resin with an effective amount of amine-based curing agent, (b) applying said mixture to said peripheral edge surface so as to contact the outer peripheral surface of said ion-conducting material layer, and (c) curing said mixture thereon.

2. The method of claim 1, wherein said aromatic glycidyl amine resin is represented as follows:

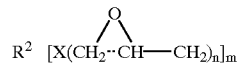

where:
  $R^2$ is phenylene or naphthylene; X is N, $NR^3$, $CH_2N$, $CH_2NR^3$, O and/or C(O)—O; $R^3$ is an alkyl group containing 1–4 carbon atoms, a cyanoethyl group or a cyanopropyl group; n is 1 or 2; and m is 2 to 4.

3. The method of claim 1, wherein said amine resin comprises N,N,N',N'-tetraglycidyl-m-xylenediamine.

4. The method of claim 1, wherein said mixture is applied by extrusion.

5. The method of claim 1, wherein said device is an electrochromic lens.

6. An edge-sealed laminated electrochromic device prepared by the method of claim 1.

7. The device of claim 6, wherein said resin is represented as follows:

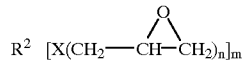

where:
  $R^2$ is phenylene and/or naphthylene; X is N, $NR^3$, $CH_2N$, $CH_2NR^3$, O and/or C(O)—O; $R^3$ is an alkyl group containing 1–4 carbon atoms, a cyanoethyl group or a cyanopropyl group; n is 1 or 2; and m is 2 to 4.

8. A laminated electrochromatic device prepared by the method of claim 1, wherein said amine resin comprises N,N,N',N'-tetraglycidyl-m-xylenediamine.

9. A laminated electrochromic lens comprising an ion-conducting polymer layer disposed between a coated first lens and a second less, said laminated electrochromic lens having a peripheral edge surface prone to moisture gain or loss through said ion-conducting polymer layer, wherein said peripheral edge surface contains a mixture comprising an aromatic glycidyl amine resin and an effective amount of amine-based curing agent wherein said mixture is cured thereon and said mixture is in contact with said ion-conducting polymer layer on said peripheral edge surface of the lense.

10. The lens of claim 9, wherein said ion-conducting polymer is an ionomer.

11. The lens of claim 9, wherein said ion-conducting polymer is an AMPSA homopolymer or copolymer.

12. The lens of claim 9, wherein said aromatic glycidyl amine resin is represented as follows:

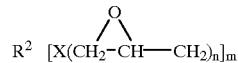

where:
  $R^2$ is phenylene and/or naphthylene; X is N, $NR^3$, $CH_2N$, $CH_2NR^3$, O and/or C(O)—O; $R^3$ is an alkyl group containing 1–4 carbon atoms, a cyanoethyl group or a cyanopropyl group; n is 1 or 2; and m is 2 to 4.

13. A method for sealing the peripheral edge surface of a laminated electrochromic device, said peripheral edge surface comprising the outer peripheral surfaces of first and second substrates and outer peripheral surface of an ion-conducting material layer, said method comprising (a) applying an aromatic glycidyl amine resin to said peripheral edge surface, (b) applying an effective amount of amine-based curing agent to said resin and mixing in situ therewith, and (c) curing said mixture thereon wherein said mixture is in contact with said ion-conducting polymer layer on said peripheral edge surface of the lens.

14. An edge-sealed laminated electrochromic device prepared by the method of claim 13.

* * * * *